(12) United States Patent
Snyder

(10) Patent No.: US 6,381,519 B1
(45) Date of Patent: Apr. 30, 2002

(54) CURSOR MANAGEMENT ON A MULTIPLE DISPLAY ELECTRONIC FLIGHT INSTRUMENTATION SYSTEM

(75) Inventor: Mark I. Snyder, Glendale, AZ (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 09/680,874

(22) Filed: Oct. 6, 2000

Related U.S. Application Data

(60) Provisional application No. 60/233,825, filed on Sep. 19, 2000.

(51) Int. Cl.[7] .............................. G09G 5/08; G06F 3/14
(52) U.S. Cl. .............................. 701/3; 701/14; 701/15; 701/211; 701/212; 244/175; 244/3.16
(58) Field of Search .............................. 701/3, 14, 211, 701/202, 206, 208; 345/331; 340/995, 971

(56) References Cited

U.S. PATENT DOCUMENTS 5,931,874 A * 8/1999 Ebert et al. ..................... 701/1
6,104,969 A * 8/2000 Beeks ............................. 701/1
6,112,141 A * 8/2000 Briffe et al. ................... 701/14

FOREIGN PATENT DOCUMENTS

EP 0763714 A2 * 3/1997

* cited by examiner

Primary Examiner—William A. Cuchlinski, Jr.
Assistant Examiner—Tuan C To

(57) ABSTRACT

An aircraft display and control system generally includes a processor, a cursor control and selection device, an aeronautical information database, a geographic database, and a plurality of display devices. Users, such as an aircraft pilot and copilot, can perform flight plan entry and modification by manipulating graphical information on the display devices using cursor control. In one embodiment, the present invention allows multiple members of an aircraft crew to share control of common flight information display areas, aids the crew's situational awareness by providing software-implemented dynamic symbology and highlighting to indicate cursor location, current panel of entry, and current focus for keyboard and cursor events.

17 Claims, 7 Drawing Sheets

CURSOR MANAGEMENT ON A MULTIPLE DISPLAY ELECTRONIC FLIGHT INSTRUMENTATION SYSTEM

This invention claims priority from U.S. patent application Ser. No. 60/233,825, filed Sep. 19, 2000.

BACKGROUND OF THE INVENTION

1. Technical Field

This invention relates, generally, to data display systems and, more particularly, to a system and method for graphical interaction with an aircraft information display system.

2. Background Information

Aircraft flight displays continue to advance in sophistication, achieving increasingly higher levels of information density and, consequently, presenting a greater amount of visual information to be perceived and understood by the operator. In many applications, it is important that visual displays provide a proper cognitive mapping between what the operator is trying to achieve and the information available to accomplish the task. As a result, such systems increasingly utilize human-factor design principles in order to build instrumentation and controls that work cooperatively with human operators. Accordingly, the Federal Aviation Administration (FAA) has promulgated a number of standards and advisory circulars relating to flight instrumentation. More particularly, Title 14 of the U.S. Code of Federal Regulations, Federal Aviation Regulations (FAR) Part 25, Sec. 25.1321 et seq. provides guidelines for arrangement and visibility of instruments, warning lights, indicators, and the like. Similarly, detailed guidelines related to electronics displays can be found in FAA Advisory circular 20–88A, *Guidelines on the Marking of Aircraft Powerplant Instruments* (September 1985).

One area in particular that has not profited in advances in graphical user interfaces is the field of aircraft flight management systems. Specifically, in current generation aircraft, flight plan entry and editing continues to be performed using cumbersome, text-based techniques that have not changed significantly in the last decade. As a result, flight crews frequently complain that current flight management systems (FMS) are non-intuitive, difficult to interpret, and require too much heads-down time. Indeed, due to the high cockpit workload involved, many flight crews abandon the FMS altogether, choosing instead to fly the aircraft using the autopilot.

Systems and methods are therefore desired to overcome these and other limitations of the prior art. Specifically, there is a long felt need for an interface to flight management systems that is intuitive and easy to use, and which enables multiple flight crew members to concurrently interact with the FMS.

BRIEF SUMMARY OF THE INVENTION

The present invention provides systems and methods for an integrated graphical user interface that facilitates the display and editing of aircraft data with improved cursor management. In accordance with various aspects of the present invention, one or more users (e.g., a pilot and a co-pilot) located within the aircraft provide input to a processor through one or more cursor control devices and receive visual feedback via an electronic display. The display includes various graphical elements associated with the lateral position, vertical position, flight plan and/or other indicia of the aircraft's operational state as determined from avionics data and/or various data sources. Through use of one or more cursor control devices, one or more users may view, modify, or otherwise interact with the displayed flight plan and/or other such indicia graphically in accordance with feedback provided by the display.

An aircraft display and control system in accordance with the present invention generally includes a processor, a cursor control and selection device, an aeronautical information database, a geographic database, and a plurality of display devices. Users, such as an aircraft pilot and copilot, can perform flight plan entry and modification by manipulating graphical information on the display devices using cursor control. In one embodiment, the present invention allows multiple members of an aircraft crew to share control of common flight information display areas, aids the crew's situational awareness by providing software-implemented dynamic symbology and highlighting to indicate cursor location, current panel of entry, and current focus for keyboard and cursor events.

BRIEF DESCRIPTION OF THE DRAWINGS

A more complete understanding of the present invention may be derived by referring to the following detailed description and claims when considered in connection with the following illustrative figures.

DETAILED DESCRIPTION OF EXEMPLARY EMBODIMENTS

Systems and methods in accordance with various aspects of the present invention facilitate one or more users' graphical interaction with an aircraft information display. In this regard, the present invention may be described herein in terms of functional block components and various process steps. It should be appreciated that such functional blocks may be realized by any number of hardware, firmware, and/or software components configured to perform the various specified functions. For example, the present invention may employ various integrated circuit components, such as, for example, memory elements, digital signal procession elements, look-up tables, and the lich, which may carry out a variety of functions under the control of one or more microprocessors or other control devices. Such general techniques and components that are known to those skilled in the art are not described in detail herein.

Figure 1:
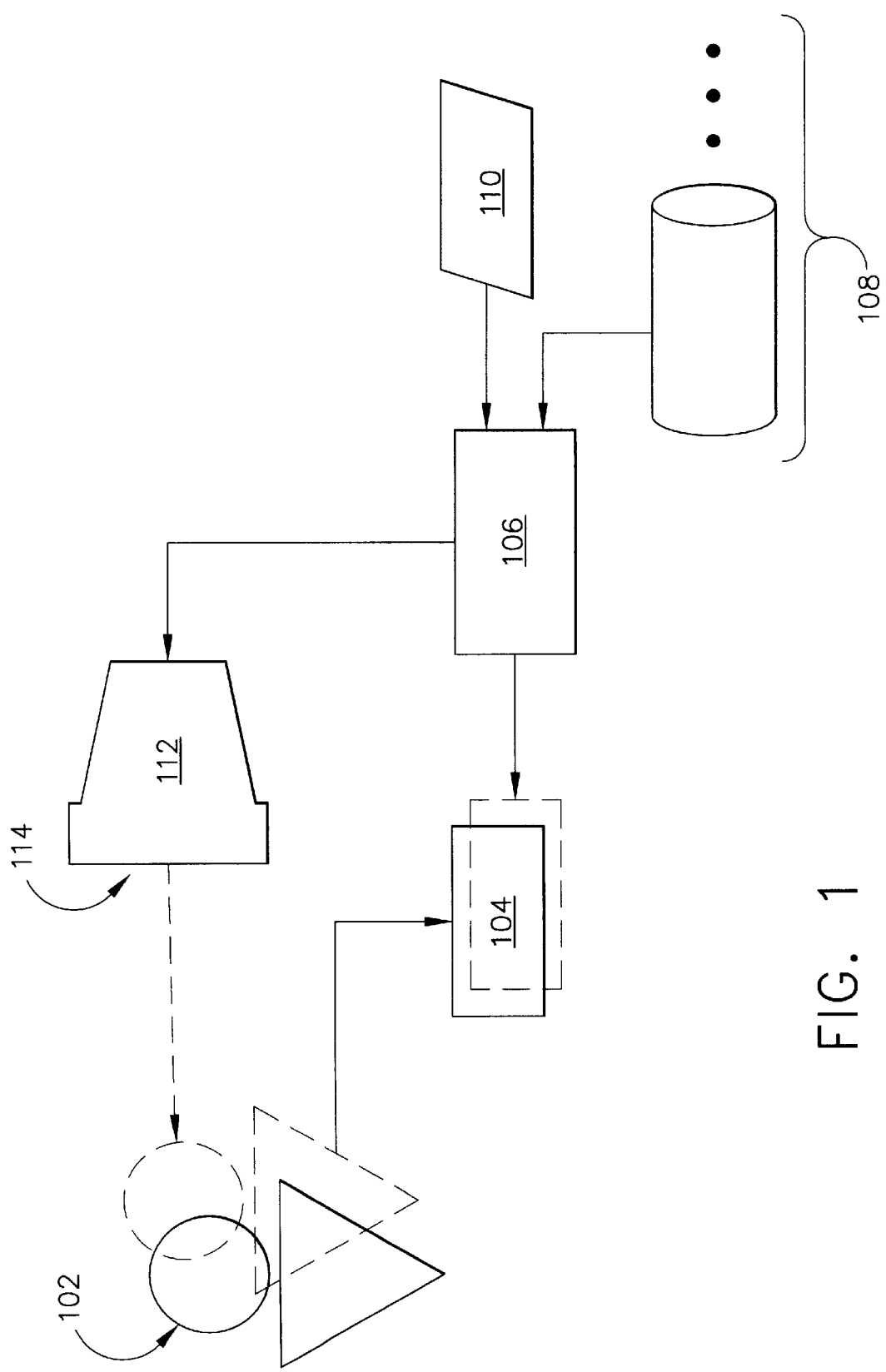
FIG. 1 is a schematic overview of a user interface in accordance with one embodiment of the present invention.

Referring now to FIG. 1, a system in accordance with various aspects of the present invention includes a processor 106 configured to communicate with an associated monitor (or monitors) 112, one or more data sources 108, one or more cursor control devices 104, and avionics data 110. In general, one or more users 102, such as, for example, a pilot and/or a co-pilot, located within an aircraft (not shown), provide input to processor 106 through cursor control device (or devices) 104, and receive visual feedback via a display 114 produced by monitor 112. Display 114 includes various data elements associated with the lateral position, vertical position, flight plan and/or other indicia of the aircraft's operational state as determined from avionics data 110 and/or data sources 108. Through use of cursor control device(s) 104, user(s) 102 may interact with the data elements graphically in accordance with feedback provided by display 114.

Cursor control device 104 includes any device suitable to accept input from user 102 and to convert that input to a graphical position on display 114. Various joysticks, mice, trackballs, and the like are suitable for this purpose. In one embodiment, cursor control device 104 includes a touch-pad interface device with a thumb actuation switch on the side. In this embodiment, the user rests his or her hand on a built-in palm rest to stabilize the hand, position the fingertip for pointing, and position the thumb for clicking. In an alternate embodiment, cursor control device 104 is a trackball device coupled with one or more keys or push-buttons used to select data captured by the cursor.

Monitor 112 may include any display monitor suitable for displaying the various symbols and information detailed herein. Many conventional monitors are suitable for this task, including, for example, various cathode ray tube (CRT), liquid crystal display (LCD), Heads Up Displays (HUDs), Helmet Mounted Displays (HMDs) and other electronic display systems.

Processor 106 encompasses one or more functional blocks used to provide flight management and control, to interface with cursor control device 104, and to drive monitor 112. In this regard, processor 106 may include any number of individual microprocessors, memories, storage devices, interface cards, and other conventional components known in the art.

Avionics data 110 includes aeronautical information related to the state of the aircraft derived from an aeronautical information database. Data sources 108 include various types of data required by the system, such as, for example, flight plan data, data related to airways, navigational aids (Navaids), symbol textures, navigational data, obstructions, font textures, taxi registration, Special Use Airspace, political boundaries, COM frequencies (en route and airports), approach information, and the like. Typically, for example, a geographical information database is included within data sources 108.

Figure 2:
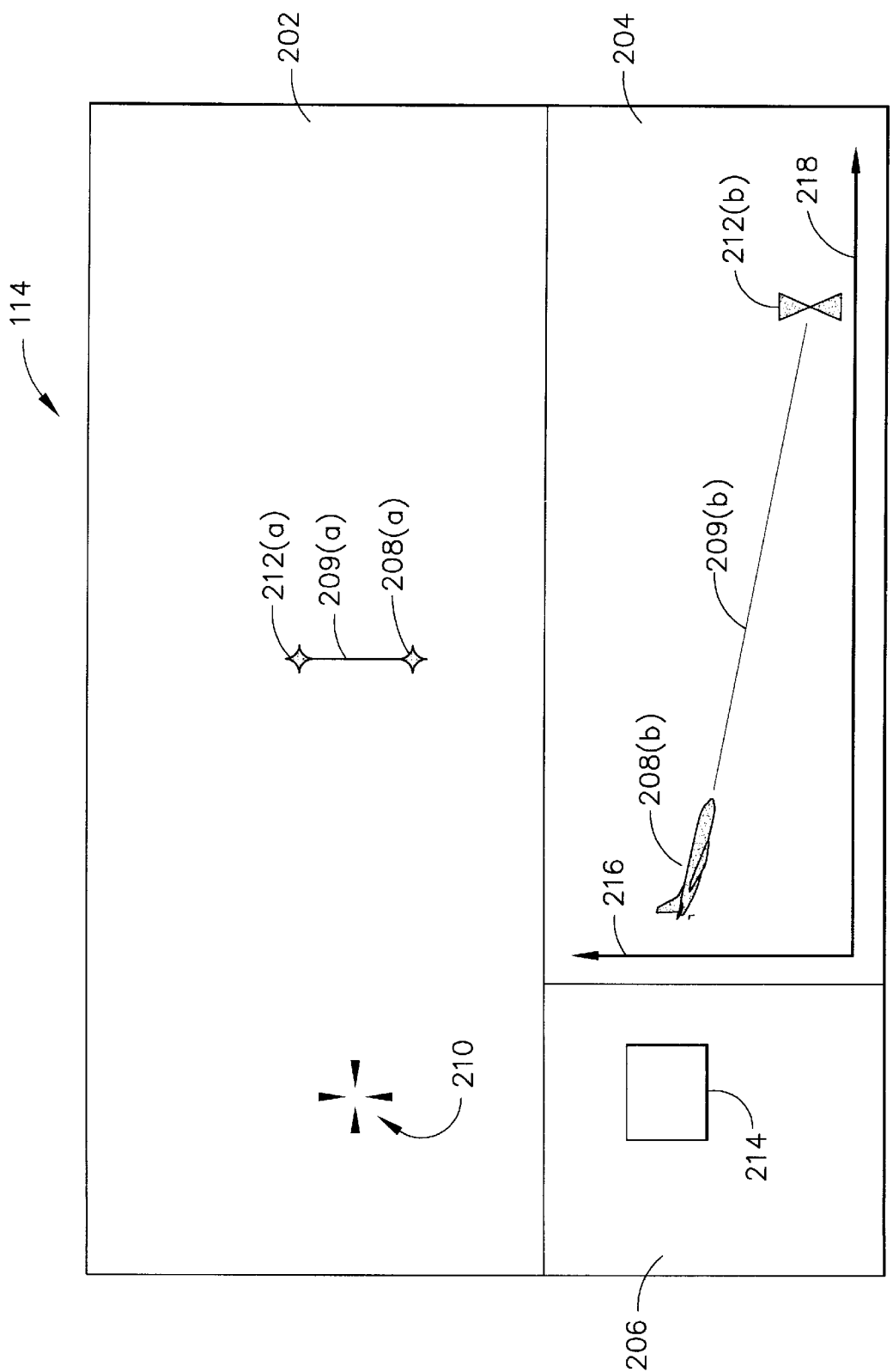
FIG. 2 is a schematic overview of a display arrangement in accordance with one aspect of the present invention.

Referring now to FIG. 2, a display 114 in accordance with various exemplary aspects of the present invention includes a lateral view 202, a vertical profile view (or "vertical profile") 204, and a hot-map view (or simply "hot-map") 206.

Vertical profile 204 suitably includes a side-view aircraft symbol 208(b), one or more waypoint symbols 212(b) (or constraint symbols, described in detail below), line segments 209(a) connecting waypoint symbols 212(b), a first axis 218 representing lateral position and/or time, and a second axis 216 designating altitude. As with the lateral view 202, the system is preferably configured such that the user may modify the flight plan and trajectory via graphical manipulation of symbols 212(b) using cursor symbol 210.

In one embodiment, the various areas of display 114 may be expanded to facilitate display and editing of the flight plan. For example, when the user clicks cursor 210 within vertical profile 204 of display 114, that region expands to fill a larger area of the total display area of display 114.

Referring further to FIG. 2, lateral view 202 suitable includes various graphical elements ("symbols") representing, among other things, the lateral position of the aircraft with respect to the ground. Lateral view 202 may also include various map features, including terrain, political boundaries, and the like. In the illustrated embodiment, lateral view 202 includes a top view aircraft symbol 208(a), one or more waypoint symbols 212(a), and line segments 209(a) connecting waypoint symbols 212(a), wherein waypoint symbols 212(a) are associated with the current flight path of the aircraft. Display 114 may also include one or more cursor symbols 210 positioned in accordance with input from one or more users 102 (see FIG. 1) received via one or more cursor control devices 104 (see FIG. 1). While the details of the user's interaction with lateral view 202 will be discussed further below, in general, cursor 210 is suitable positioned by the user in order to select and graphically edit data elements appearing on display 114, such as, for example, the flight plan associated with waypoints 212(a).

As briefly mentioned above, in addition to lateral view 202 and vertical profile 204, an embodiment of the present invention includes a hot-map region which encompasses a larger albeit simplified lateral area than that shown in lateral view 202. A rectangular or square outline corresponding to the region shown in lateral view 202 may be displayed in hot map.

Figure 3:
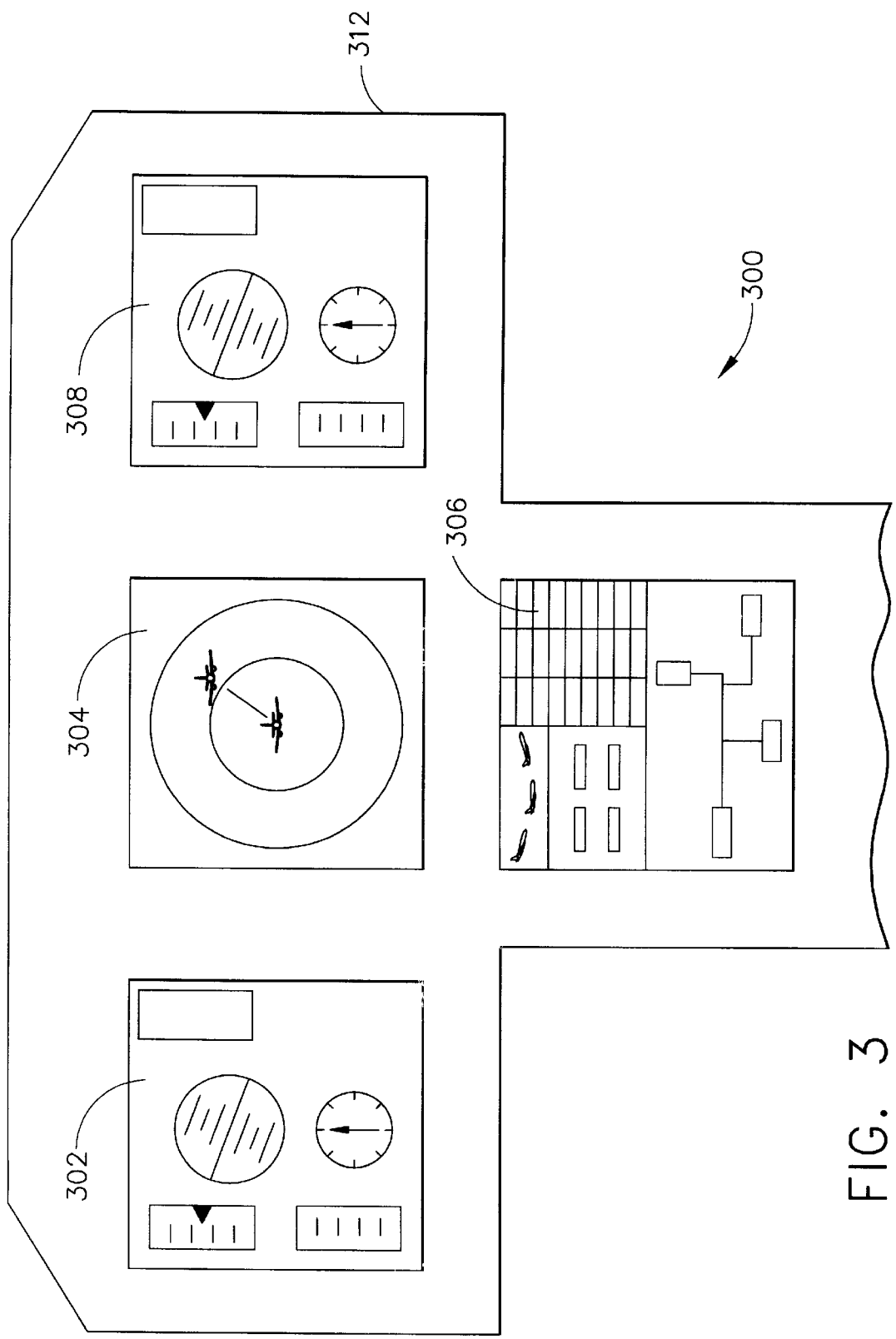
FIG. 3 is a schematic overview of a flight deck which embodies certain aspects of the present invention.

FIG. 3 is a representation of certain features of an aircraft cockpit display layout in accordance with one aspect of the present invention. Displays 302, 304, 306, and 308 are included on an instrumental panel 312 of a flight deck 300 and generally comprise four display devices (such as display devices 114 in FIG. 1), such as, for example, color flat-panel LCD screens. Outboard displays 302 and 308 are each constitute a Primary Flight Display (PFD). All flight information and short-range information is located on displays 302 and 308. Inboard displays 304 and 306 each constitute a Multi-Function Display (MFD). Displays 304 and 306 can be used by more than one person, requiring only coordinated management. Instrument panel 312 also includes standby instruments (not shown). The standby instruments may be of conventional type, such as an altimeter, airspeed indicator, attitude indicator, and instrument landing system (ILS) glide slope/localizer indicator. Alternatively, they could be implemented as flat panel electronic instruments. Regardless of whether conventional or flat panel electronic instruments are utilized, these instruments are generally meant only as a back-up to displays 302, 304, 306, and 308.

Thus, in the cockpit of FIG. 3, one user (e.g., a pilot) may be present at the left side of the cockpit, in front of display 302 and adjacent to displays 304, 306, while another user (e.g., a co-pilot) may be present at the right side of the cockpit, in front of display 306 and adjacent to displays 304, 306. Displays 302, 304, 306, and 308 need not be coplanar. Indeed, in a typical aircraft cockpit, displays 302, 304, and 306 may be substantially coplanar, with display 308 located on a separate console between the pilot and co-pilot. It should also be noted that displays 302, 304, 306, and 308 need not be identically or substantially identically sized and are not shown to scale, as each display may have a different aspect ratio than that shown.

Figure 4:
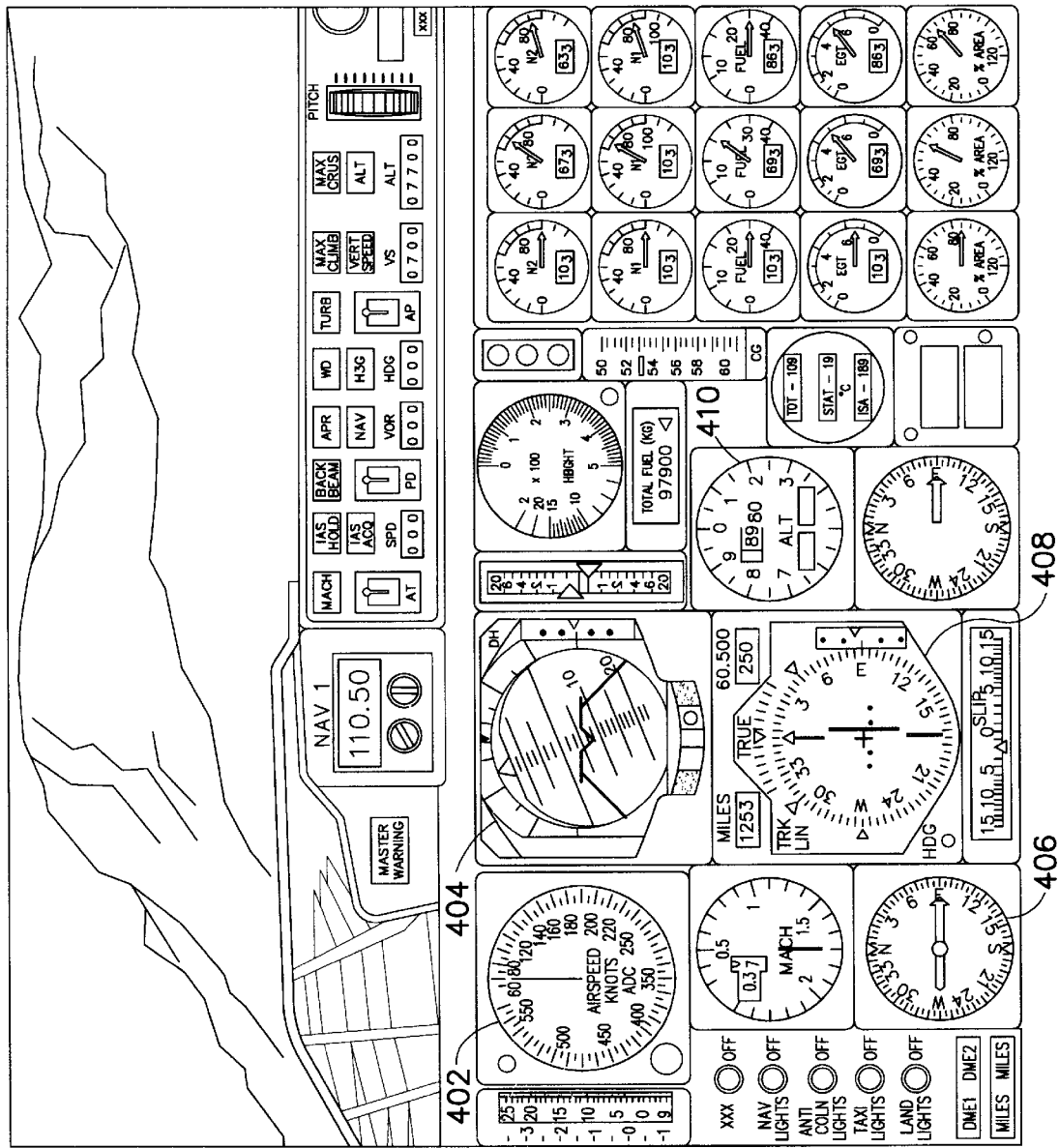
FIG. 4 is a schematic diagram of the components of a prior art flight deck.

Displays 302, 304, 306 and 308 provide a functionality that formerly was provided by a plurality of gauges on an instrumentation panel. In the past, a cockpit generally would contain separate gauges to indicate, inter alia, attitude, altitude, airspeed and vertical speed. This is illustrated in FIG. 4, which is a graphical representation of an exemplary prior art cockpit. Illustrated in FIG. 4 are, inter alia, airspeed indicator 402, attitude indicator 404, radio compass 406, horizontal situation indicator 408, and altimeter 410.

Figure 5:
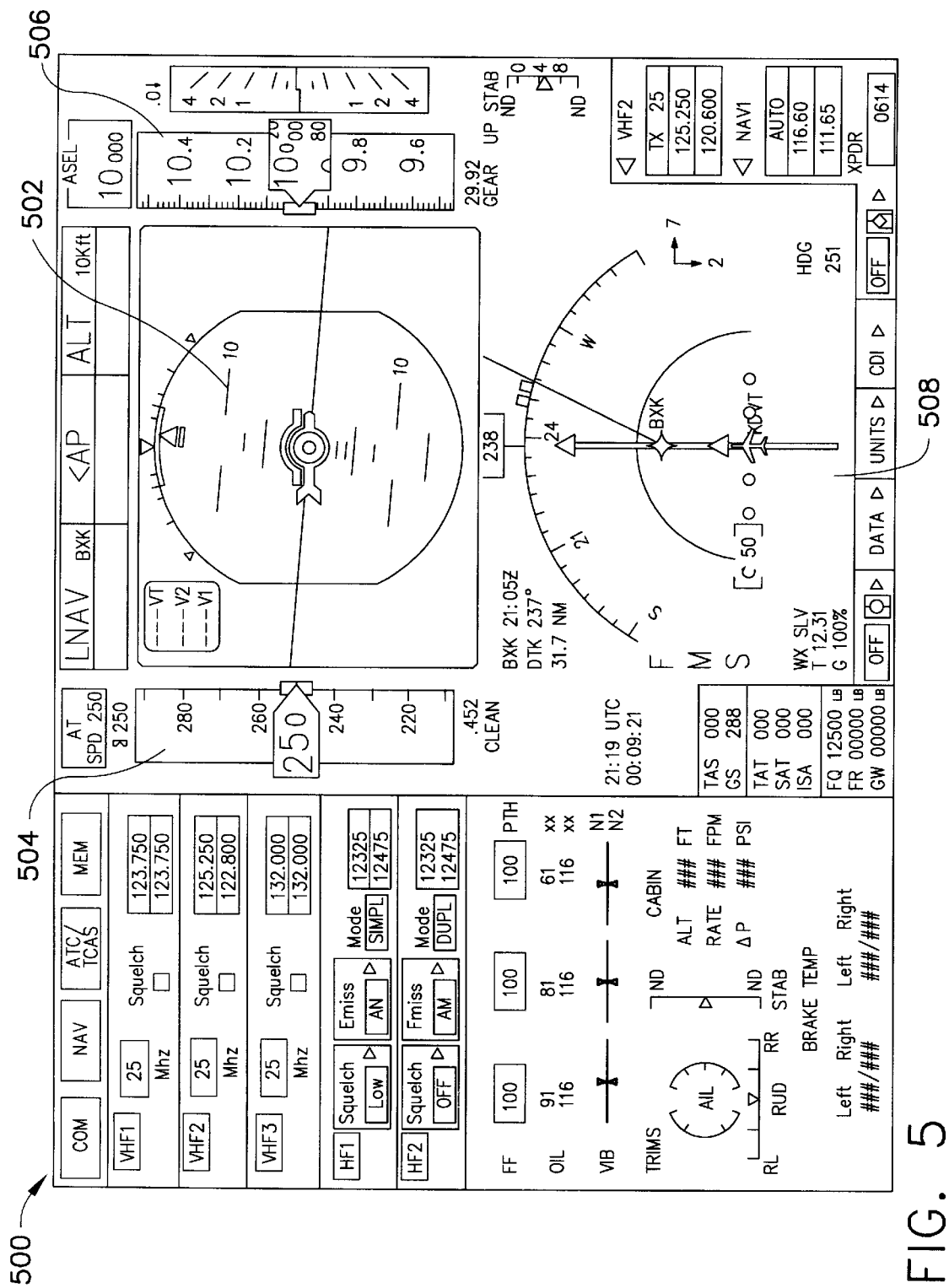
FIG. 5 is a representation of an exemplary display device in accordance with certain aspects of the present invention.

The individual gauges illustrated in FIG. 4 have in recent years been replaced by various display units. For example, FIG. 5 illustrates an exemplary display 500. Display 500 is a single CRT or LCD display unit in which graphical representations of an attitude indicator, airspeed indicator, altimeter, and horizontal situation indicator have been rendered in separate areas of display 500 by a computer. Specifically, area 502 contains a rendering of an attitude indicator, area 504 displays the airspeed, altimeter 506 displays the altitude, and heading source indicator (HSI) 508 shows the heading of the aircraft.

Referring back to FIG. 3, in typical usage, display 302 and display 308 will show substantially identical information, such that the pilot and the co-pilot have access to the same information. Typically displays 302 and 308 will be configured in a manner similar to that shown in FIG. 5, such that the attitude, altitude, airspeed, and heading are displayed. Display 304 may be configured, for example, to display navigational information, such as an indication of the current heading of the aircraft and data regarding the surrounding area.

Displays 304 and 306 are used for managing the flight plan, carrying out flight path modification, and monitoring aircraft systems and sensors availability. The corresponding procedures involve extensive use of cursor control and multifunction keyboard. Alternatively, the functions of the keyboard and/or cursor control could be performed by other suitable conventional means, such as direct voice input.

Figure 6:
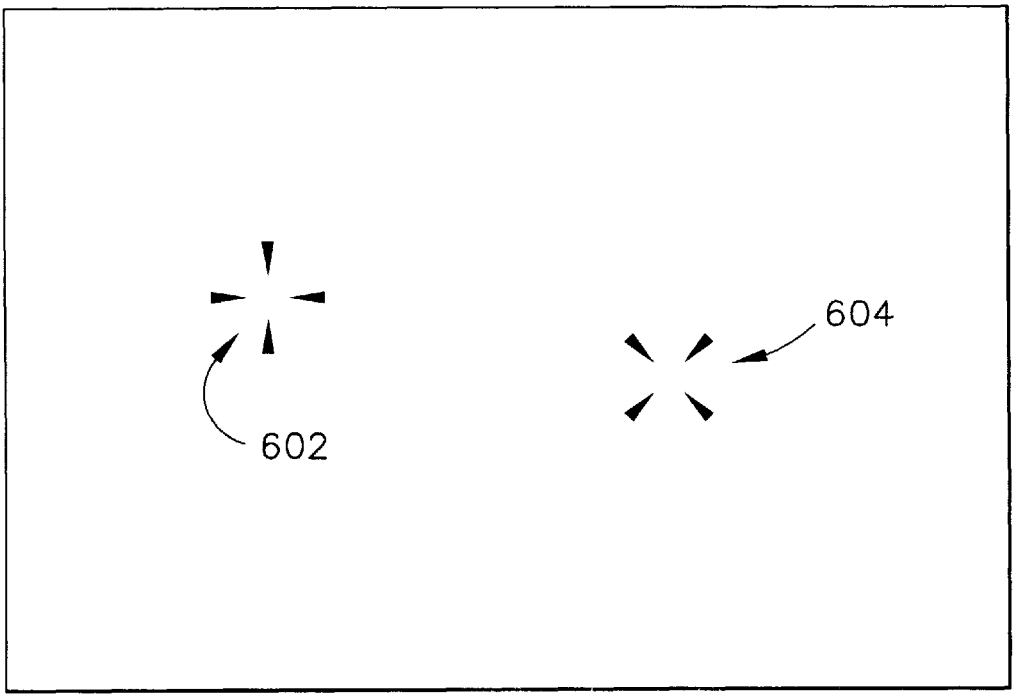
FIG. 6 is a diagram showing the configuration of different cursor symbols displayed on multi-function display units of the flight deck of FIG. 3.

One aspect of the design of displays 304 and 306 is the ability for both pilot and copilot to access both displays from each seat, using a distinctive cursor, as shown in FIG. 6. Both displays provide the same options and are coupled to synchronized FMS processors. Both displays are synchronized such that, for example, when the pilot is working on, for example, an en route high altitude chart on display 304, the copilot can work on the same chart on display 306, using a different range scale or type of format. The pilot and copilot can also work together on the same panel, on the same display, each one using a separate multifunction keyboard and a separate cursor control device to interact with the display system. One further aspect of joint access to displays 304 and 306 is that only one cursor and keyboard may be active within a given "panel" or window at a time.

Access to and between displays 304 and 306 is implemented by a "cursor skip" function, which selectively permits each cursor to move about each display. In one embodiment, this cursor skip function is selectively implemented by cursor control velocity. For example, if a pilot slowly operates the cursor control device to move the cursor to the bottom of display 304, the cursor will stop at the bottom edge of display 304 to prevent the cursor from inadvertently "skipping" to display 306. Subsequent slow movement of the cursor control device downward will not result in further downward movement of the cursor. Rapid operation of the cursor control, however, will cause the cursor to "skip over" to display 306. The pilot can then use the cursor and related buttons, knobs, and/or keys to implement any feature available on display 306. Similarly, this cursor skip function may be implemented to control movement of the cursor between and among displays 302, 304, and 306 and between and among displays 304, 306, and 308. The cursor skip function could, of course, be implemented using a selector other than cursor control velocity. For example, a dedicated button or key could be provided, operation of which would be required to permit "cursor skip" to an adjacent display.

The following functions are redundantly included in both displays 304 and 306 to permit a flight to depart even if one display is inoperable: display engine parameters and warning/caution messages; display all aircraft electrical, fuel, air conditioning, hydraulics systems; display horizontal situation and vertical profile; manage FMS and AFIS; manage normal and abnormal checklists; and display general maintenance items in flight that can be easily understood by the crew.

In various embodiments, the cursor control devices and multifunction keyboards are the primary means of interacting with the MFDs. Operation of the cursor involves the actions of cursor "capture" and "selection," commonly know in the personal computer world as "point and click." For example, when a pilot is interacting with horizontal situation indicator, the cursor is movably superimposed upon points on the map by action of the cursor control device. Certain of these points on the map constitute special positions recognized by the system: RNAV points, routes, airports, and the like. When the cursor is superimposed on one of such points, the point is "captured," that is, the background around the captured point changes color, and the cursor is displayed behind this background. To "select" the captured point, an action button on the cursor control device is operated. This causes data stored for this point in system memory to appear as an information window displayed at the cursor location. The pilot can then begin modification of the parameter displayed in the window, using the multifunction keyboard, for instance. It is also possible and may be beneficial to designate soft keys and labels, which will cause the corresponding function or option to be selected.

In various embodiments, there may be no priority given to either pilot in interacting with displays 304 and 306. Each pilot can work with his or her cursor on both displays, and both pilots can also work together on the same display, or on the same function on different displays. In the latter case, the system accounts for the chronological order of actions. One possible exception, however, may be that if one pilot has already begun a modification, the other pilot cannot interfere with this parameter as long as the procedure is not terminated. However, the second pilot can modify another parameter on the same display. Hence, it is possible to get both cursors on the same display. The cursors for each pilot may be graphically different, as shown, for example, in FIG. 6. In FIG. 6, the cursors differ in their geometric configuration. In other practical applications of the present invention, the cursors may be distinguished by color, size, shape, or other suitable configuration.

Figure 7:
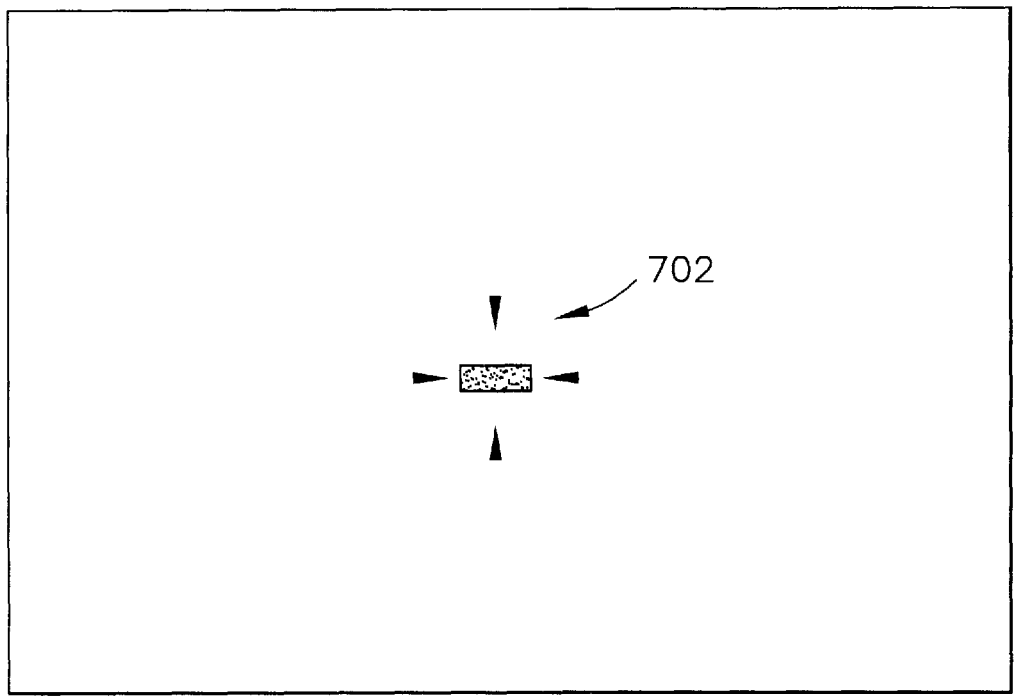
FIG. 7 illustrates a different configuration of a cursor symbol in an "inactivated" state.

In one aspect of the present invention, when both cursors are present in the same panel of the same display and action is being taken by one pilot with regard to the cursor, the other pilot's cursor changes configuration as shown in FIG. 7. Cursor configuration 702 indicates that the cursor is inactivated. Once the first pilot's modifications are completed, terminated, or otherwise "timed-out," the first pilot's cursor will change to configuration 702 and the second pilot's cursor will return to its normal state. In this way, each pilot may ascertain at a glance whether their intended modifications may be made at any point in time. If the cursors are positioned such that their actions will not interfere with one another, it is not necessary for one cursor to be inactivated, and hence the cursor configurations will remain in their normal state (as illustrated, for example, in FIG. 6).

The MFDs are configured to allow the pilots to modify selected parameters displayed as a window. When a cursor is positioned over a particular parameter, its background changes color and a modification can be effectuated by entering a new value with a keyboard, "dialing" a new value with a knob, or by any other means configured to perform such entries. While being modified, the parameter may be displayed cyan with cyan framing, or with any other format or color. When the modification is completed, the pilot presses the "ENT" or "Enter" key on the keyboard, or clicks the button on the cursor control device. If the pilot presses "ENT" or clicks without entering new data, the cursor automatically skips to the following parameter field. In one aspect of the invention, it is possible to exit the modification process by double-clicking the button of the cursor control device, so that the system returns to the previous status.

Figure 8:
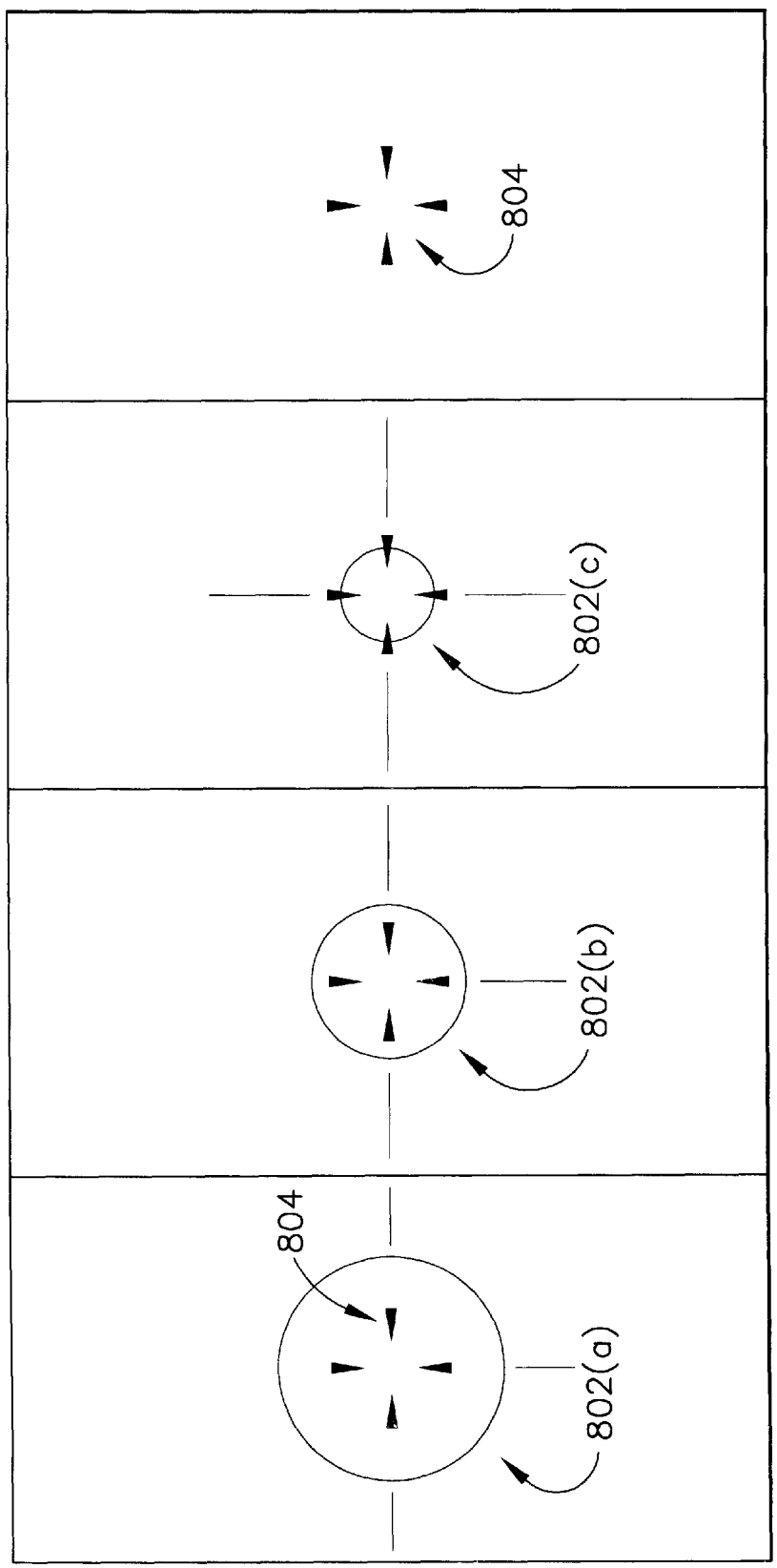
FIG. 8 is a schematic representation of the dynamic highlighting feature embodied in one aspect of the present invention.

If a displayed cursor remains inactive for a given period of time—that is, if its position is not altered using the cursor control device or if no other action is taken—the cursor may be configured to "time out" and to disappear from the display panel until further action is taken. Once the cursor is timed out and removed from view, no further modification of displayed parameters is made until the cursor is refreshed. The cursor may be refreshed—that is, once again made visible-by simply moving the cursor control device even slightly or by operating a button or key so configured to restore the cursor to the display area. In one aspect of the invention, the cursor is highlighted upon restoration to the display and comes back in the same position as when it was timed out. This highlighting may take the form of a brightly-colored "halo" around the cursor and a highlighting of the panel frame, such that the cursor may be found quickly and easily by the pilot during operation of the aircraft. This highlighting effect is maintained briefly, giving the pilot adequate time to locate the cursor, but then fades away such that it does not interfere with the display graphics. In one embodiment, as illustrated in FIG. 8, a light-colored yellow halo 802(a) is displayed around a cursor 804 at the moment it is restored, and the gray frame outlining the display panel at which the cursor lies is highlighted in cyan. Through a time period of about 1–3 seconds, the light-colored yellow halo gradually decreases in size and intensity (see 802(b), 802(c)) until cursor 804 has been restored to its normal state.

As mentioned briefly above, systems in accordance with the present invention provide the ability to graphically modify and/or enter flight-plan information via the cursor-control device. It should be understood that the exemplary methods illustrated may include more or less steps or may be performed in the context of a larger process scheme. Furthermore, the various flowcharts presented in the drawing figures are not to be construed as limiting the order in which the individual process steps may be performed.

Thus it is apparent that there has been provided herein a system and a method for aircraft information display and control that fully meets the needs set forth above. Although the invention has been described and illustrated with reference to certain illustrative examples, it is not intended that the invention be limited to these illustrative embodiments. Those of skill in the art will recognized that various modifications and alternatives are possible without departing from the spirit of the invention. For example, although reference has been made throughout to "aircraft," it is intended that the invention also be applicable to vehicles that are on the ground or in space. Accordingly, it is intended that the invention include all such modifications and alternatives as fall within the scope of the appended claims.

What is claimed is:

1. A system for interacting with an aircraft electronic information display, said system comprising:

a first cursor control device configured to accept first user input;

a second cursor control device configured to accept second user input;

a processor coupled to said first cursor control device and said second cursor control device, said processor configured to process said first user input and said second user input and to produce a display on a monitor viewable by a user, wherein said display includes: a first cursor symbol responsive to said first user input; a second cursor symbol responsive to said second user input; and at least one data element associated with the aircraft;

said processor further configured to allow selection and editing of said at least one data element by said first user and said second user; and a hot-frame, said first cursor symbol changing shape in response to said first cursor symbol entering said hot-frame.

2. A system for interacting with an aircraft electronic information display, said system comprising:

a first cursor control device configured to accept first user input;

a second cursor control device configured to accept second user input;

a processor coupled to said first cursor control device and said second cursor control device, said processor configured to process said first user input and said second user input and to produce a display on a monitor viewable by a user, wherein said display includes: a first cursor symbol responsive to said first user input; a second cursor symbol responsive to said second user input; and at least one data element associated with the aircraft;

said processor further configured to allow selection and editing of said at least one data element by said first user and said second user; and a hot-frame, said second cursor symbol changing shape in response to said second cursor symbol entering said hot-frame.

3. A system for interacting with an aircraft electronic information display, said system comprising:

a first cursor control device configured to accept first user input;

a second cursor control device configured to accept second user input;

a processor coupled to said first cursor control device and said second cursor control device, said processor configured to process said first user input and said second user input and to produce a display on a monitor viewable by a user, wherein said display includes: a first cursor symbol responsive to said first user input; a second cursor symbol responsive to said second user input; and at least one data element associated with the aircraft;

said processor further configured to allow selection and editing of said at least one data element by said first user and said second user, said processor further configured to remove said first cursor symbol and said second cursor symbol from said display after a time period exceeding a threshold value during which said first cursor control device and said second cursor control device, respectively, have remained inactive.

4. An aircraft information display apparatus comprising:
- a first cursor control device configured to accept first user input;
- at least a second cursor control device configured to accept at least a second user input;
- at least one processor coupled to said first cursor control device and each second cursor control device, each processor configured to process said first user input and each second user input and to produce a display on at least one monitor, each display including a first cursor symbol responsive to said first user input;
- at least a second cursor symbol responsive to each second user input and at least one data element associated with the aircraft flight information; the first user input and the second user input being configured to commonly share the display of each of said monitors; and
- a hot-frame, said first cursor symbol changing shape in response to said first cursor symbol entering said hot-frame, said second cursor symbol changing shape in response to said second cursor symbol entering said hot-frame.

5. The apparatus of claim 4, the processor being configured to access avionics data associated with the aircraft.

6. The apparatus of claim 5, said processor being configured to access at least one data source.

7. The apparatus of claim 6, said first cursor control device including a touch-pad interface.

8. The apparatus of claim 6, said second cursor control device including a touch-pad interface.

9. The apparatus of claim 6, said display comprising at least one flat-panel color display device.

10. The apparatus of claim 6, said first cursor symbol having a shape different from said second cursor symbol.

11. The apparatus of claim 5 further comprising at least a second hot-frame, wherein said processor is further configured to inactivate one of said first cursor and said second cursor when both said first cursor and said second cursor concurrently occupy said second hot-frame.

12. The apparatus of claim 11, each cursor having a distinctive shape different from the shape of all other cursors.

13. An display apparatus for displaying aircraft data, the apparatus comprising:
- a first cursor control device configured to accept first user input;
- at least a second cursor control device configured to accept at least a second user input;
- at least one processor coupled to said first cursor control device and each second cursor control device, each processor configured to process said first user input and each second user input and to produce a display on at least one monitor, each display including a first cursor symbol responsive to said first user input, each processor further configured to access avionics data associated with the aircraft and at least one data source,
- at least a second cursor symbol responsive to each second user input and at least one data element associated with the aircraft flight information; the first user input and the second user input being configured to commonly share the display of each of said monitors, each first cursor symbol being shaped different from each of said second cursor symbols; and
- a hot-frame, said first cursor symbol changing shape in response to said first cursor symbol entering said hot-frame, said second cursor symbol changing shape in response to said second cursor symbol entering said hot-frame.

14. The apparatus of claim 13, said first cursor control device including a touch-pad interface.

15. The apparatus of claim 14, said second cursor control device including a touch-pad interface.

16. The apparatus of claim 15, said display comprising at least one flat-panel color display device.

17. The apparatus of claim 16 further comprising at least a second hot-frame, wherein said processor is further configured to inactivate one of said first cursor and said second cursor when both said first cursor and said second cursor concurrently occupy said second hot-frame.

* * * * *